US007975460B1

(12) United States Patent
McIlwain

(10) Patent No.: US 7,975,460 B1

(45) Date of Patent: Jul. 12, 2011

(54) STABILIZATION SYSTEM FOR A CROP HARVESTING HEADER

(75) Inventor: Irwin D. McIlwain, Lancaster, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 12/699,342

(22) Filed: Feb. 3, 2010

(51) Int. Cl.
*A01D 34/00* (2006.01)

(52) U.S. Cl. ........................................................ 56/15.8

(58) Field of Classification Search ................... 56/15.8, 56/14.4, 208, DIG. 10
See application file for complete search history.

(56) References Cited

U.S. PATENT DOCUMENTS 3,771,302 A 11/1973 Vogt
3,783,594 A * 1/1974 Watt et al. ...................... 56/15.8
4,081,946 A * 4/1978 Ehrhart .......................... 56/14.4
4,127,981 A * 12/1978 Parrish et al. .................. 56/14.4
4,137,696 A * 2/1979 Webb .............................. 56/208
4,174,602 A * 11/1979 Webb et al. ..................... 56/208
4,211,057 A 7/1980 Dougherty et al.
4,318,631 A 3/1982 Vickers
4,519,188 A * 5/1985 Webster et al. ............ 56/16.4 R
4,669,256 A * 6/1987 Ermacora et al. .............. 56/13.6
4,722,173 A 2/1988 Covington et al.
4,961,303 A 10/1990 McCarty et al.
5,115,628 A 5/1992 Garter et al.
5,357,737 A * 10/1994 Ermacora et al. .......... 56/16.4 R
5,535,578 A 7/1996 Honey
5,960,620 A 10/1999 Wright et al.
6,530,197 B1 3/2003 Christensen et al.
6,810,653 B2 11/2004 Derscheid
2006/0053761 A1 3/2006 Lougheed et al.
2006/0277888 A1 12/2006 Erdmann et al.
2008/0163599 A1 7/2008 Funk et al.
2009/0100817 A1 4/2009 Godfrey

* cited by examiner

*Primary Examiner* — Árpád Fábián-Kovács

(74) *Attorney, Agent, or Firm* — Michael G. Harms; Patrick M. Sheldrake

(57) ABSTRACT

A stabilization system used with a crop harvesting header includes a frame carrying a belt to deliver a crop to the header. The frame is independently movable between a first angle between the frame and the header and a second angle between the frame and the header. A member has an inside surface connectable in substantially non-rotational contact to a first structure of one of the frame or the header, and an outside surface connectable in substantially non-rotational contact to a second structure of the other of the frame or the header. In response to rotational movement of the first structure in substantially non-rotational contact with the inside surface, rotational movement of the first structure occurring with respect to the second structure in substantially non-rotational contact with the outside surface, the member provides a stabilizing torsional force between the frame and the header between the first and second angles.

20 Claims, 7 Drawing Sheets

14 38 32 40

66 72 68 60 62 74 82 76 70 84 80 64 78 68

STABILIZATION SYSTEM FOR A CROP HARVESTING HEADER

FIELD OF THE INVENTION

The present invention relates generally to crop gathering devices. It relates more particularly to crop gathering devices for use with harvesting headers.

BACKGROUND OF THE INVENTION

Crop gathering devices for collecting crops arranged in windrows can include a belt positioned along the front of the device. The belt is driven to rotate between opposed pairs of roller assemblies to convey the crops into a header that is secured to an agricultural harvester, such as a combine which is directed along the windrow. One or more wheels is located near the belt opposite the header to maintain a spacing between the belt and the ground that most effectively conveys crops onto the belt.

During operation of the harvester, for reasons including uneven terrain and velocity of the harvester, the spacing between the belt and the ground can deviate from an optimum crop conveying position. In response, tension springs have been positioned between the crop gathering device and the header. While use of tension springs can help reduce such deviations, forces applied by tension springs can vary broadly in response to changes in length of the springs.

What is needed is a stabilization system that provides a stabilizing force between the crop gathering device and the header over the range of movement between the crop gathering device and the header.

SUMMARY OF THE INVENTION

The present invention relates to a stabilization system for use with a crop harvesting header including a frame carrying a structure movable about an endless path to deliver a crop to the header. The frame has opposed ends and is pivotably connected to the header, each end of the frame being independently movable between a first angle between the frame and the header and a second angle between the frame and the header. A member having an inside surface is connectable in substantially non-rotational contact to a first structure of one of the frame or the header. The member has an outside surface connectable in substantially non-rotational contact to a second structure of the other of the frame or the header. In response to rotational movement of the first structure in substantially non-rotational contact with the inside surface, there being rotational movement of the first structure with respect to the second structure in substantially non-rotational contact with the outside surface, the member provides a stabilizing torsional force between the frame and the header between the first and second angles.

The present invention further relates to a kit for use with a crop harvesting header including a frame carrying a structure movable about an endless path to deliver a crop to the header. The frame has opposed ends and is pivotably connected to the header. Each end of the frame is independently movable between a first angle between the frame and the header and a second angle between the frame and the header. The kit includes a member having an inside surface connectable in substantially non-rotational contact to a first structure of one of the frame or the header. The member has an outside surface connectable in substantially non-rotational contact to a second structure of the other of the frame or the header. In response to rotational movement of the first structure in substantially non-rotational contact with the inside surface, there being rotational movement of the first structure with respect to the second structure in substantially non-rotational contact with the outside surface, the member is configured to provide a stabilizing torsional force between the frame and the header between the first and second angles.

The present invention still further relates to a stabilization system for use with a crop harvesting header including a frame carrying a structure movable about an endless path to deliver a crop to the header. The frame has opposed ends and pivotably connected to the header, each end of the frame independently movable between a first angle between the frame and the header and a second angle between the frame and the header. A member comprises a contiguous mass of resilient material defining a closed geometric profile and having an inside surface connectable in substantially non-rotational contact to a first structure of one of the frame or the header. The member has an outside surface connectable in substantially non-rotational contact to a second structure of the other of the frame or the header. In response to rotational movement of the first structure in substantially non-rotational contact with the inside surface, there being rotational movement of the first structure with respect to the second structure in substantially non-rotational contact with the outside surface, the member provides a selectably adjustable stabilizing torsional force between the frame and the header between the first and second angles.

An advantage of the present invention is the application of a stabilizing force with reduced variability, compared with tension springs, between the crop gathering device and the header over the range of movement between the crop gathering device and the header.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
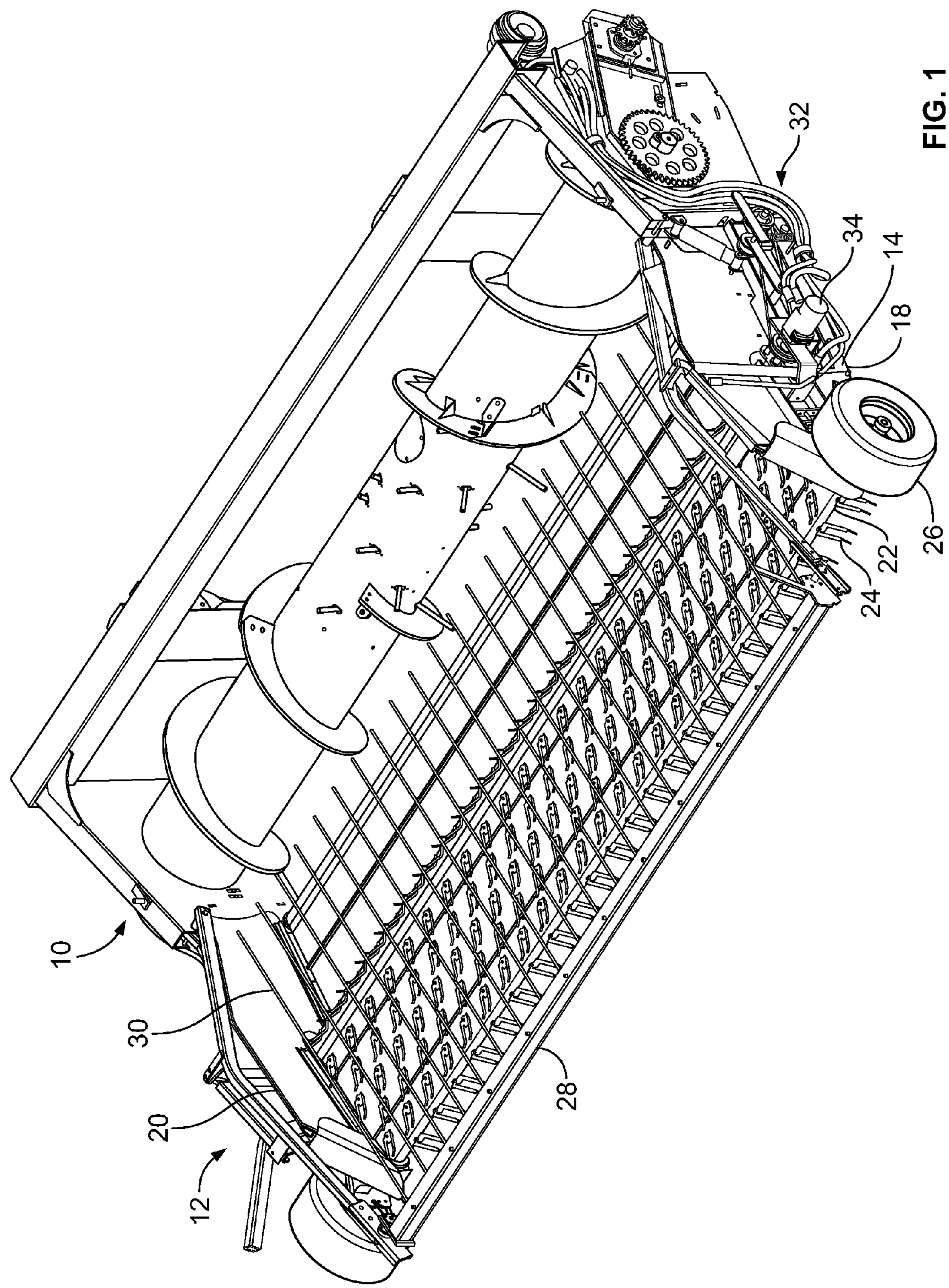
FIG. 1 is a top perspective view of an embodiment of a crop gathering device and harvesting header of the present invention.
Figure 2:
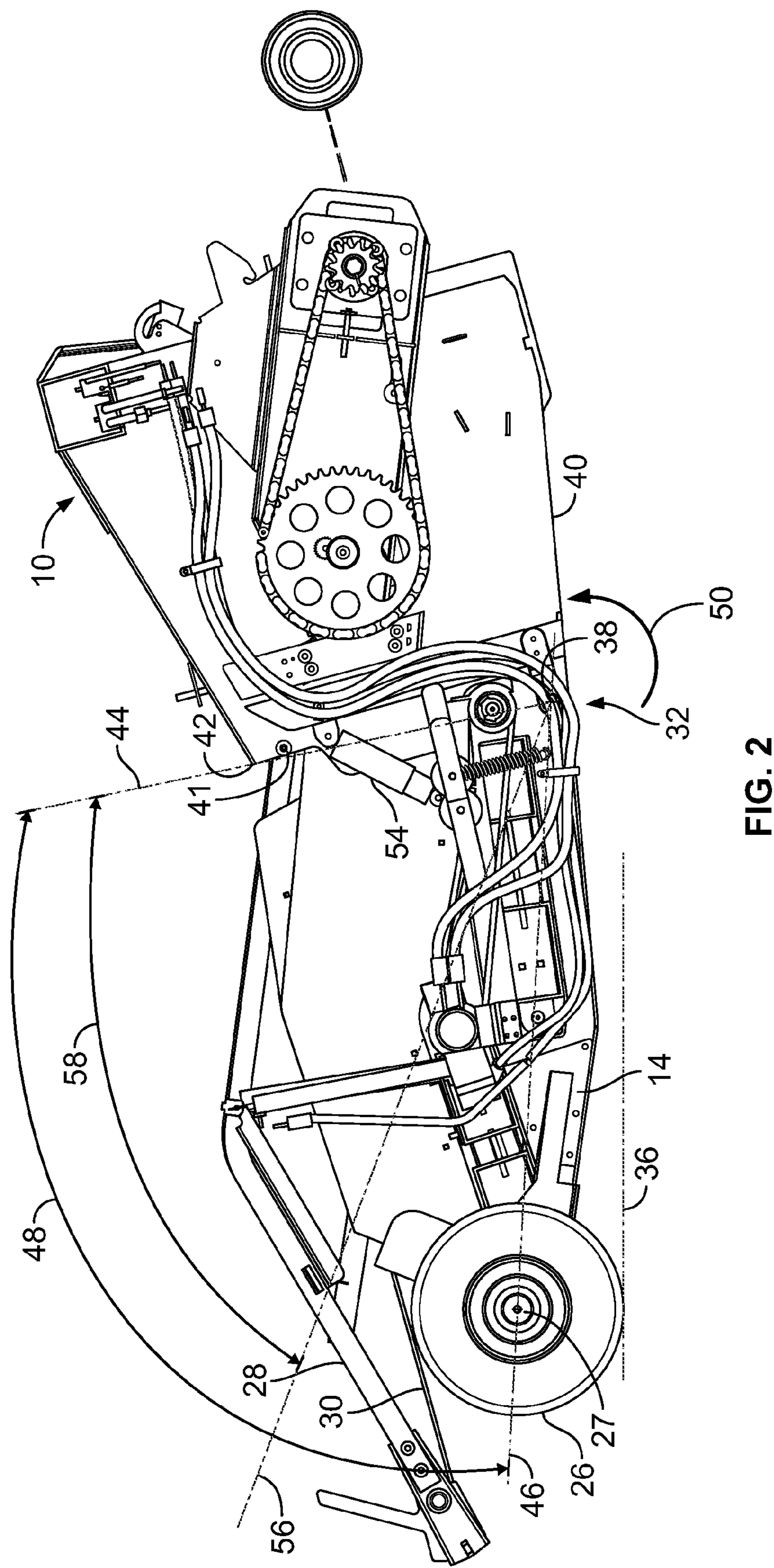
FIG. 2 is a side view of the crop gathering device of FIG. 1 (the crop conveying belt not shown) of the present invention.
Figure 3:
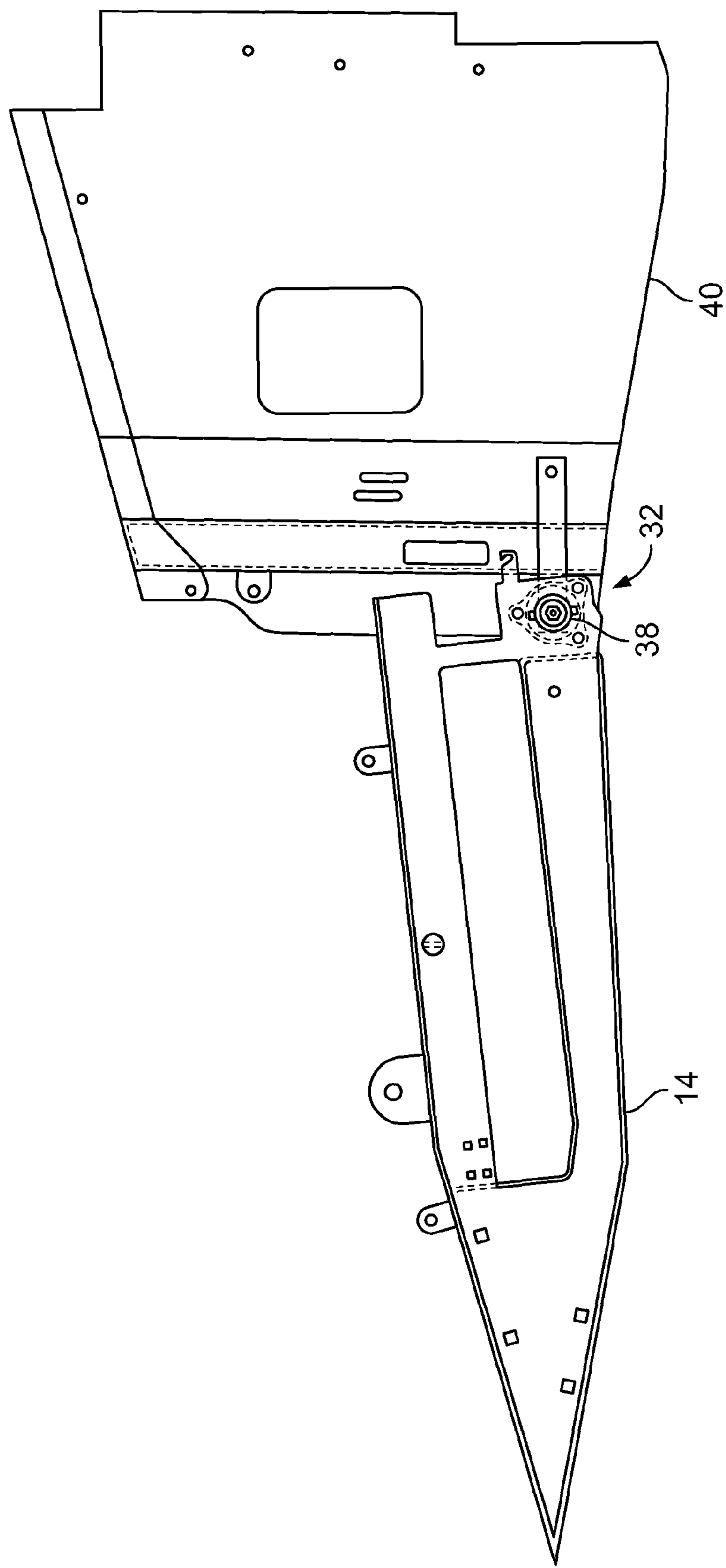
FIGS. 3-4 are side views of alternate embodiments of the crop gathering device (components removed for clarity) and harvesting header of the present invention.

FIGS. 1-3 show a crop gathering device 12 for use with a harvesting header 10. Harvesting header 10 may be secured to an agricultural vehicle such as a combine (not shown) as is known in the art and not further discussed. A frame 14 carries a structure 22 movable about an endless path to deliver a crop to harvesting header 10. In one embodiment, structure 22 is a belt, or multiple belts, that extends from one end 18 of frame 14 toward another end 20 of frame 14. Structure 22 may be driven about a set of parallel rollers (not shown) by a power source such as a hydraulic motor 34. Structure 22 may include a plurality of tines 24 or fork-like components extending outwardly from the structure to assist with collecting crops arranged in a windrow. Wheels 26 may be rotatably secured to or near respective ends 18, 20 of frame 14 opposite header 10 to maintain one end of structure 22 near the ground 36 to permit tines 24 of structure 22 to gather or collect crops arranged in the windrow. A guide 28 equipped with tines 30 may be positioned over structure 22 to more effectively feed crops from structure 22 to header 10.

Frame 14 may be pivotally connected with header 10 about a pivot 38 such as a pin. Without intending to limit the invention, several axes are provided to provide context for the pivotal movement between frame 14 and header 10. Header 10 includes a frame 40. A corner 42 of frame 40, with pivot 38 and corner 40 defines an axis 44 of header 10. In an alternate embodiment, axis 44 corresponds to the edge of frame 40 of header 10. In one position of frame 14, such as when wheel 26 is in contact with ground 36, an axis 46 is defined by pivot 38 and the center 27 of wheel 26. An angle 48 is subtended by axes 44 and 46. In another position of frame 14, such as when wheel 26 is raised above and out of contact with ground 36, an axis 56 is defined by an upper position along frame 14 and pivot 38 and through center 27 of wheel 26. An angle 58 is subtended by axes 44 and 56.

During operation of crop gathering device 12, in which wheel 26 is in contact with ground 36, stabilization system 32 is in a first position, providing a stabilizing torsional force 50 to frame 14 and header 10. That is, stabilization system 32 provides stabilizing torsional force 50 in response to rotational movement about pivot 38 of frame 14 with respect to frame 40 of header 10, as will be discussed in further detail below. In addition, during further operation of crop gathering device 12, during which wheel 26 is moved to a position that is above ground 36 (such as by striking an obstacle in the field) resulting in center 27 of wheel 26 coinciding with axis 56 (in one instance), stabilization system 32 provides a stabilizing torsional force 50 of increased magnitude, as will be further discussed below.

Optionally, a resilient device 54, such as a tension spring may be used in combination with stabilization system 32, which may dampen overeactions of relative rotational movement between frame 14 and header 10.

While an exemplary embodiment as shown in FIG. 2 is representative of stabilization system 32 providing a stabilizing torsional force 50 resulting in a lowering force, it is to be understood that stabilizing torsional force 50 provided by stabilization system 32 may be either a lifting force or a lowering force, depending upon the settings of stabilization system 32. That is, a lifting force would reduce the amount of force wheels 26 apply to ground 36, while a lowering force would increase the amount of force wheels 26 apply to ground 36.

Figure 4:
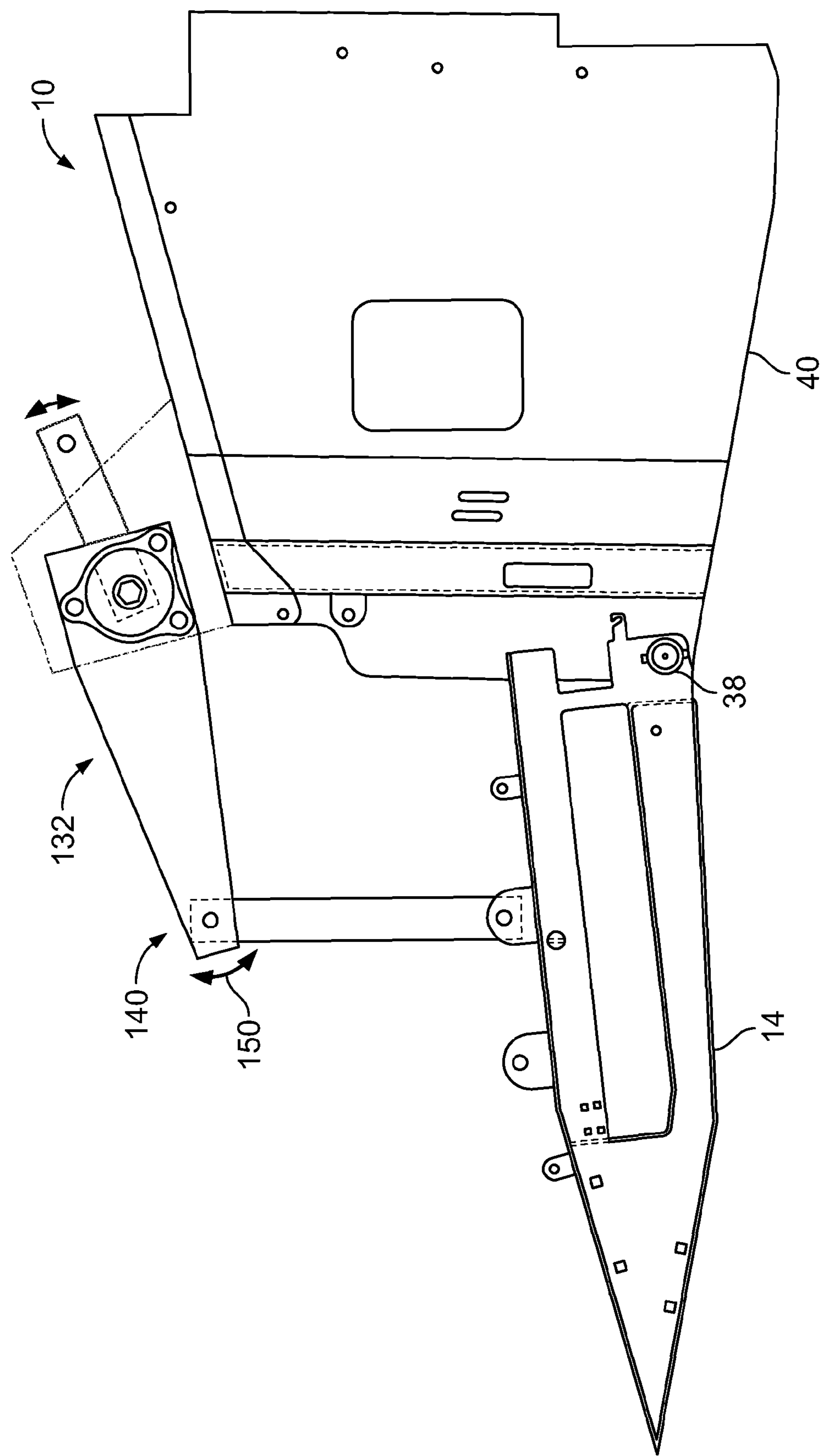

FIGS. 3-4 show alternate embodiments of stabilization system 32, 132. For example as further shown in FIG. 3, stabilization system 32 is positioned along an axis of rotation corresponding with pivot 38. As further shown in FIG. 4, stabilization system 132 is at a distance from pivot 38, and includes a linkage 140 that transmits the stabilizing torsional force provided by the stabilization system.

Figure 6:
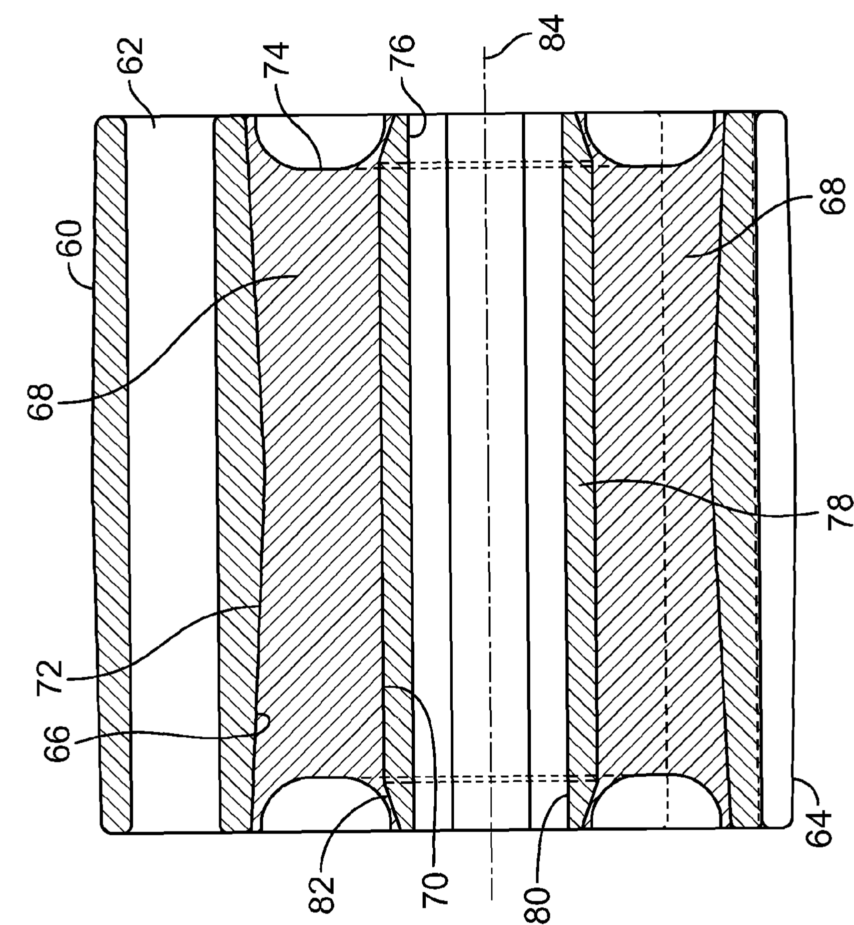
FIG. 6 is a cross section taken along line 6-6 of FIG. 5 of the present invention.
Figure 5:
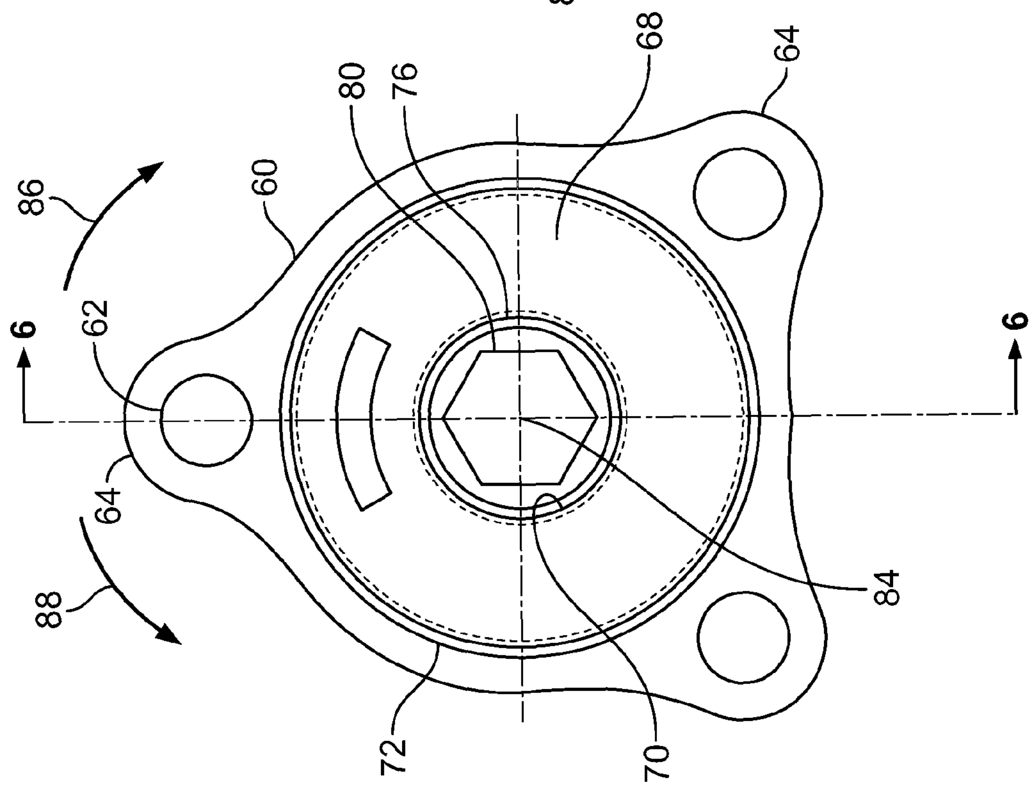
FIG. 5 is a side view of a stabilization system of the present invention.

FIGS. 5-6 show a side view and a cross section, respectively, of the stabilization system. As shown, a housing 60 includes a plurality lobes 64 having corresponding apertures 62 formed in the lobes, permitting the housing to be secured to other structure, such as frame 14 or frame 40 (FIG. 2) by mechanical fasteners extending through the other structure and apertures 62 (not shown). Housing 60 includes an inside surface 66 that may include a tapered surface, such as shown in FIG. 6. A member 68, which includes an inside surface 70 and an outside service 72, is composed of a resilient material and is inserted inside of housing 60. In one embodiment, member 68 is composed of a non-metal, such as a rubber material. In a further embodiment, the rubber material has a durometer value of between about 50 and about 60. Inside surface 66 of housing 60 is configured to receive outside surface 72 of member 68 and define a substantially non-rotational contact therebetween. Stated another way, subsequent to insertion of member 68 inside of housing 60, in response to a rotational movement 86 applied in a clockwise direction about an axis 84 to housing 60 and an opposed rotational movement 88 applied in a counter clockwise direction about axis 84 to member 68, inside surface 66 and outside surface 72 should not rotatably move with respect to each other. Such non-rotational contact may be established by application of adhesives, interference-fit (due to the periphery of inside surface 66 being larger than the periphery of outside surface 72), mating surface features, such as splines, or the like.

As further shown in FIGS. 5-6, inside surface 70 of member 68 is configured to receive a sleeve 76 having an outside surface 78 and inside surface 80. Housing 60 and sleeve 76 are composed of substantially rigid materials, such as metals. When member 68 and sleeve 76 are assembled together, inside surface 70 of the member and outside surface 78 of the sleeve define a substantially non-rotational contact therebetween, as discussed above. Inside surface 80 of sleeve 76 defines a geometric shape that is configured to receive an object, such as a shaft, in a substantially non-rotational contact. As shown in FIG. 6, inside surface 80 defines a hexagonal profile, although other profiles may be used. In a further embodiment, sleeve 76 may not be used, if inside surface 70 of member 68 defines a hexagonal profile, for example.

As shown in FIG. 6, member 68 includes recessed ends 74. In one embodiment, recessed ends 74 are created during the normal cooling process of member 68, which may be composed of rubber or another suitable resilient material. That is, member 68 is heated to a liquid state and then installed while in the liquid state, such as by pouring, into housing 60 between inside surface 70 and outside surface 72. During cooling, member 68 member 68 bonds to each of inside surface 70 and outside surface 72. In an alternate embodiment, member 68 may be press-fit between inside surface 70 and outside surface 72.

In summary, by virtue of the collective substantially non-rotational contacts established between corresponding surfaces of housing 60, member 68, sleeve 76 and a shaft received by the sleeve, in response to a rotational movement 86 about axis 84 applied by a shaft member 68, and a counter rotational movement 88 about axis 84 applied to oppose the rotational movement applied by the shaft, the member is subjected to a torsional force, which is the basis for the stabilizing torsional force provided by the stabilization system.

It is to be understood that irrespective the utilization or inclusion of a sleeve as part of the stabilization system of the present invention, resilient member 68 is considered to have been placed in a substantially non-rotational contact with the inside surface of the member with that of the object being inserted inside the sleeve. For example, the sleeve could be associated with either the frame of the header or the frame of the crop gathering device, depending upon the application and or installation of the stabilization system.

Figure 7:
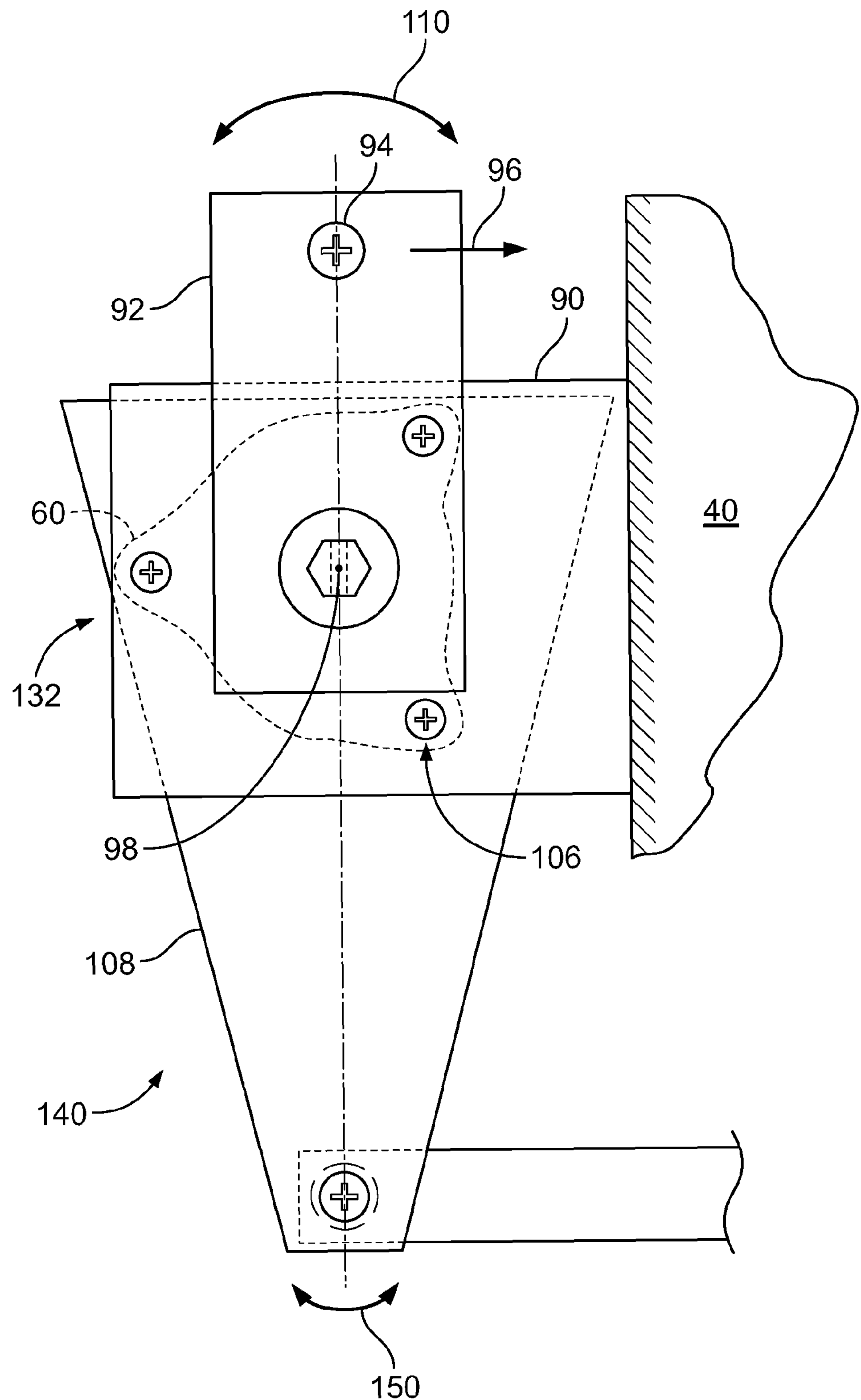
FIG. 7 is an enlarged side view of a stabilization system as shown in FIG. 3 of the present invention.
Figure 8:
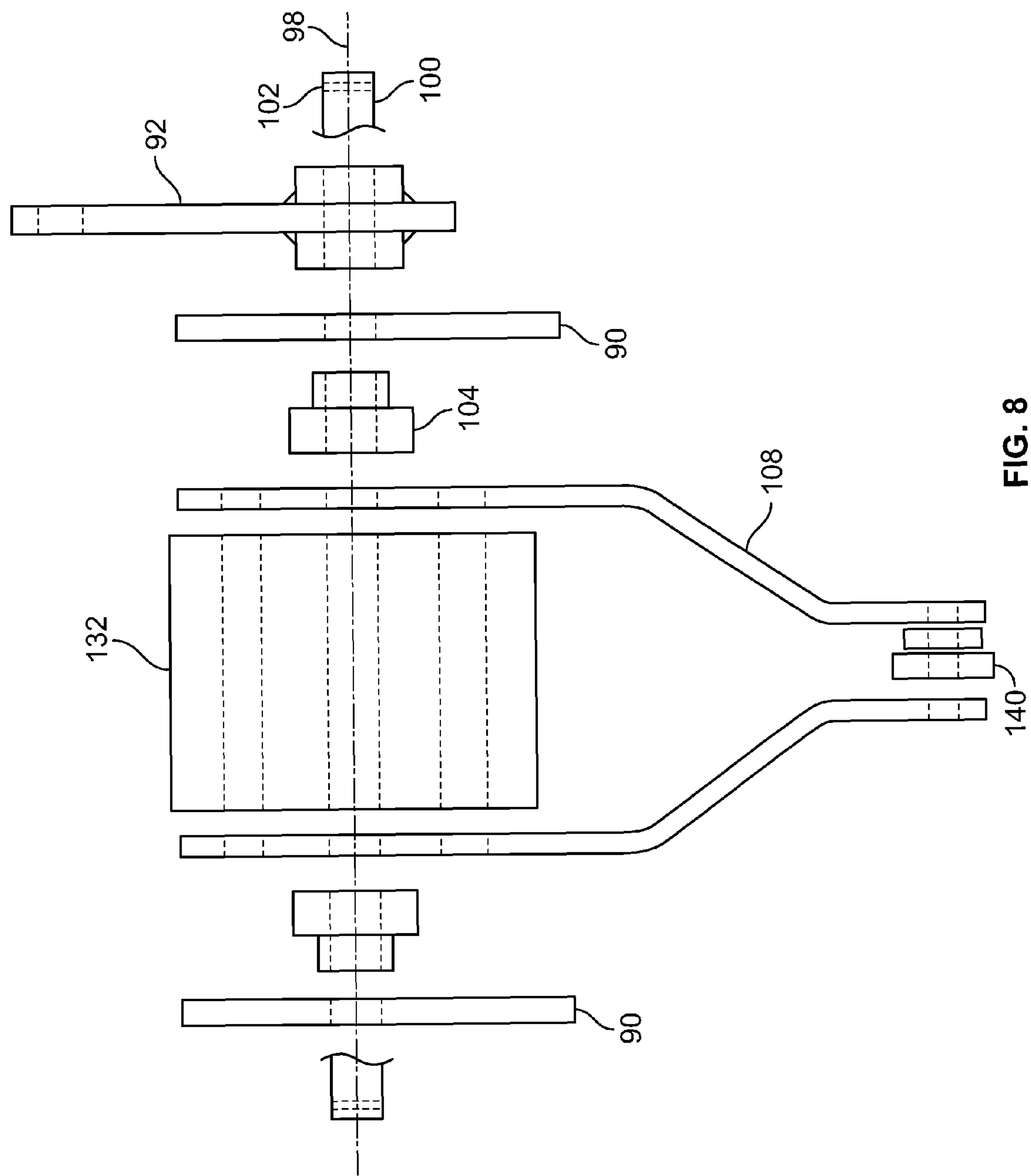
FIG. 8 is a top exploded view of the stabilization system of FIG. 5 of the present invention.

FIG. 7 shows an enlarged partial view of the exemplary embodiment of FIG. 4. Stabilization system 132 includes components as described in FIGS. 5-6 (including housing 60, member 68, and sleeve 76), as well as a pair of supports 90 that are secured to frame 40, a torque arm 92, bushings 104 and a hexagonal shaft 100. Fasteners 106 extend through arms 90 and housing 60 so that the housing does not rotate with respect to frame 40. Shaft 100 collectively extends through torque arm 92, supports 90, bushings 104, torsion arm 108 along an axis 98, although the shaft may rotate independently of supports 90, permitting relative rotational movement between torsion arm 108, which is part of linkage 140. Shaft 100 includes openings 102 formed perpendicular to axis 98 to permit installation of fasteners (not shown) such as cotter pins. Stabilization system 132 may be adjustable, i.e., provide an adjustable stabilizing torsional force, such as by adjusting a force 96 that is applied to torque arm 92 through aperture 94 of the torque arm. A draw bolt or other suitable fastener (not shown) may be utilized to vary the angle between torque arm 92 and frame 40. That is, adjustment of force 96, such as by a threaded fastener results in rotational movement 110 of torque arm 92 about axis 98. Relative rotational movement 150 of torsion arm 108 about axis 98 with respect to torque arm 92 results in the magnitude of a reactive stabilizing torsional force reacted by the stabilization system.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A stabilization system for use with a crop harvesting header comprising:

a frame carrying a structure movable about an endless path to deliver a crop to the header, the frame having opposed ends and pivotably connected to the header, each end of the frame independently movable between a first angle between the frame and the header and a second angle between the frame and the header;

a housing having a longitudinal axis, wherein the housing has an inner surface;

a member positioned in the housing, the member having an inside surface connectable in substantially non-rotational contact to a first structure of one of the frame or the header, and an outside surface positioned against the inner surface of the housing and connectable in substantially non-rotational contact to a second structure of the other of the frame or the header, wherein the inner surface of the housing is configured to gradually taper toward and away from the member along the longitudinal axis;

wherein in response to rotational movement of the first structure in substantially non-rotational contact with the inside surface, there being rotational movement of the first structure with respect to the second structure in substantially non-rotational contact with the outside surface, the member and the housing cooperate to provide a stabilizing torsional force between the frame and the header between the first and second angles.

2. The system of claim 1, wherein the stabilizing torsional force is a lifting force.

3. The system of claim 1, wherein the stabilizing torsional force is a lowering force.

4. The system of claim 1, wherein the member comprises a contiguous mass of resilient material.

5. The system of claim 1, wherein the inside surface of the member includes a sleeve.

6. The system of claim 5, wherein the resilient material is positioned between the first structure and the second structure while the resilient material is in a liquid state.

7. The system of claim 1, wherein inside surface of the member is connectable in substantially non-rotational contact to the first structure comprising the frame via a shaft extending therethrough which is coupled to a portion of the frame, the outside surface of the member positioned against the inner surface of the housing connectable in substantially non-rotational contact to the second structure comprising the header via at least one torsion arm which is connected by linkage to the header, wherein in response to rotational movement of the frame via the shaft in substantially non-rotational contact with the inside surface of the member, there being movement of the frame with respect to the header in substantially non-rotational contact with the outside surface of the member, the member and housing cooperate to provide a stabilizing torsional force between the frame and the header between the first and second angles.

8. The system of claim 1, wherein the member is located along an axis of rotation between the frame and the header.

9. The system of claim 1, wherein the member comprises a linkage between the frame and the header.

10. The system of claim 1, wherein the stabilizing torsional force is adjustable.

11. A kit for use with a crop harvesting header including a frame carrying a structure movable about an endless path to deliver a crop to the header, the frame having opposed ends and pivotably connected to the header, each end of the frame independently movable between a first angle between the frame and the header and a second angle between the frame and the header, the system comprising:

a housing having a longitudinal axis, wherein the housing has an inner surface;

a member positioned in the housing, the member having an inside surface connectable in substantially non-rotational contact to a first structure of one of the frame or the header, the member having an outside surface positioned against the inner surface of the housing and connectable in substantially non-rotational contact to a second structure of the other of the frame or the header, wherein the inner surface of the housing is configured to gradually taper toward and away from the member along the longitudinal axis;

wherein in response to rotational movement of the first structure in substantially non-rotational contact with the inside surface, there being rotational movement of the first structure with respect to the second structure in substantially non-rotational contact with the outside surface, the member and the housing cooperate to provide a stabilizing torsional force between the frame and the header between the first and second angles.

12. The kit of claim 11, wherein the member comprises a contiguous mass of resilient material.

13. The kit of claim 11, wherein the inside surface of the member is connectable in substantially non-rotational contact to the first structure comprising the frame via a shaft extending therethrough which is coupled to a portion of the frame, the outside surface of the member positioned against the inner surface of the housing connectable in substantially non-rotational contact to the second structure comprising the header via at least one torsion arm which is connected by linkage to the header, wherein in response to rotational movement of the frame via the shaft in substantially non-rotational contact with the inside surface of the member, there being movement of the frame with respect to the header in substantially non-rotational contact with the outside surface of the member, the member and housing cooperate to provide a stabilizing torsional force between the frame and the header between the first and second angles.

14. The kit of claim 13, wherein the inside surface of the member includes a sleeve, and the shaft extends through the sleeve.

15. The kit of claim 11, wherein the stabilizing torsional force is a lifting force.

16. The kit of claim 11, wherein the stabilizing torsional force is a lowering force.

17. The kit of claim 1, wherein the inside surface of the member includes a sleeve.

18. A stabilization system for use with a crop harvesting header comprising:

a frame carrying a structure movable about an endless path to deliver a crop to the header, the frame having opposed ends and pivotably connected to the header, each end of the frame independently movable between a first angle between the frame and the header and a second angle between the frame and the header;

a housing having a longitudinal axis, wherein the housing has an inner surface;

a member positioned in the housing, the member comprising comprises a contiguous mass of resilient material defining a closed geometric profile and having an inside surface connectable in substantially non-rotational contact to a first structure of one of the frame or the header, and an outside surface positioned against the inner surface of the housing and connectable in substantially non-rotational contact to a second structure of the other of the frame or the header, wherein the inner surface of the housing is configured to gradually taper toward and away from the member along the longitudinal axis;

wherein in response to rotational movement of the first structure in substantially non-rotational contact with the inside surface, there being rotational movement of the first structure with respect to the second structure in substantially non-rotational contact with the outside surface, the member and housing cooperate to provide provides a selectably adjustable stabilizing torsional force between the frame and the header between the first and second angles.

19. The system of claim 18, wherein the inside surface of the member includes a sleeve.

20. The stabilization system of claim 19, wherein the outside surface of the member has a gradual taper along the longitudinal axis in cooperation with the gradual taper of the inner surface of the housing such that the outside surface of the member is not parallel to the inside surface of the member and the sleeve positioned thereagainst along the longitudinal axis.

* * * * *